United States Patent [19]

Le Bleu

[11] Patent Number: 4,911,213
[45] Date of Patent: Mar. 27, 1990

[54] ROUTER CLAMP GUIDE APPARATUS FOR MAKING DOVETAIL JOINTS AND THE LIKE

[76] Inventor: Julien Le Bleu, 4515 W. Meadow La., Lake Charles, La. 70605

[21] Appl. No.: 332,283

[22] Filed: Mar. 31, 1989

[51] Int. Cl.$^4$ .......................... B27F 1/00; B27C 5/00
[52] U.S. Cl. ................... 144/87; 144/134 D; 144/136 C; 144/137; 144/144 R; 144/144.5 GT; 409/130; 409/182
[58] Field of Search ................. 269/41, 87.1; 409/130, 409/178, 225; 33/197, 562; 144/8 S, 87, 144 R, 144 S, 134 D, 136 C, 371, 372

[56] References Cited

U.S. PATENT DOCUMENTS

| | | | |
|---|---|---|---|
| 4,373,562 | 2/1983 | Vernon | 144/144.5 |
| 4,542,776 | 9/1985 | Kehoe | 144/144 R |
| 4,605,048 | 8/1986 | Swartout et al. | 144/144.5 |
| 4,607,673 | 8/1986 | McCord, Jr. | 144/144.5 |
| 4,632,159 | 12/1986 | Glasgo | 144/144.5 |
| 4,787,432 | 11/1988 | Williams | 144/144.5 |

Primary Examiner—W. Donald Bray
Attorney, Agent, or Firm—Pravel, Gambrell, Hewitt, Kimball & Krieger

[57] ABSTRACT

An apparatus for making dovetail cuts along the corner of a wooden box includes a frame and a pair of elongated posts movably mounted with respect to the frame, extending away from the frame and in indexing plate member mounted at the opposite end of the posts from the frame so that the posts extend from the indexing member at generally right angles thereto. The indexing member can be fixed relative to the posts and the frame includes a router guide member having a recessed portion defined by two intersecting flat surfaces that meet at a longitudinal common line parallel to the posts, and the recess registers with the wooden box workpiece corner during use. The flat surface portion of the frame carriers a guide slot with a linear axis that extends transversely with respect to the posts and at generally right angles to the common line. The guide slot can be fixed relative to the fence and the posts and the entire assembly can be secured to a wooden box-like workpiece structure to be cut, in a clamping fashion. When a common router is mounted to the apparatus, the router blade tracks the guide slot so that the router blade traverses the common line which is fitted tightly against the box corner so that a cut (such as a dovetail cut to receive a spline) is made by the router's blade.

5 Claims, 2 Drawing Sheets

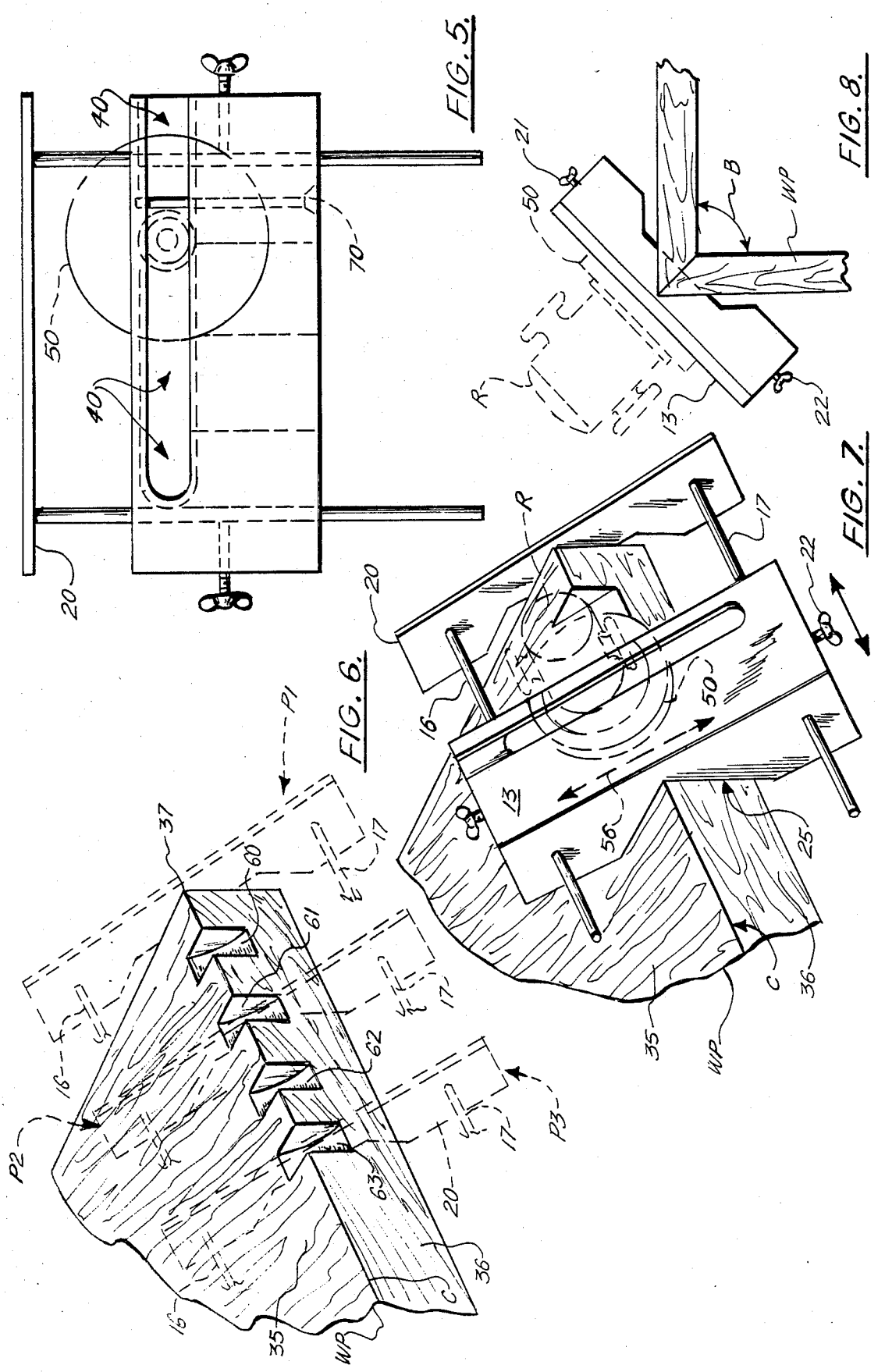

ROUTER CLAMP GUIDE APPARATUS FOR MAKING DOVETAIL JOINTS AND THE LIKE

BACKGROUND OF THE INVENTION

1. Field of the Invention

The present invention relates to woodworking devices and more particularly relates to a device for making joints in the corners of wooden boxes. Even more particularly the present invention relates to an apparatus for making joints in the corners of wooden boxes such as dovetail joints which are made by using a dovetail bit to cut a recess and then filling the recess with a wooden spline. Even more particularly, the present invention relates to an improved apparatus for making dovetail cuts in the corners of wooden boxes wherein a frame carries an elongated slot, the frame having a recessed portion which registers with the box corner and places the frame and guide at forty-five degree (45°) angles with respect to the corner so that a router mounted upon the guide in traversing the slot makes a spline receptive forty-five degree (45°) dovetail cut across the box corner.

GENERAL BACKGROUND

In the making of furniture, it is common to use various types of joints in order to form box-like structures such as drawers, for example. Typically formed by fitting together two pieces of wood at ninety degrees (90°) with respect to each other along a joint wherein mitered portions of the ends of the wood are first glued together. In order to strengthen the joint, dovetail cuts must be made through the box corner so that dovetail splines can be placed in the recesses in order to form the completed strengthened joint. The spline or wooden peg is sized so that when it is fitted to the hole a tight rigid joint is formed with the box.

The problem of forming dovetail cuts and similar joints in the corners of wooden box-like structures has been the subject of several issued patents. The following patents of which Applicant is aware all related to fixtures for forming dovetail cuts and the like.

U.S. Pat. No. 3,800,840 entitled "Dovetail Fixture" provides an apparatus for clamping and holding orthogonally disposed work pieces and for guiding a cutting tool. A slotted guide member in the form of a comb or template is held against one of the work pieces to guide a router or similar cutting tool as the bit traces the dovetail pattern. Work piece locating members are movably attached to both the horizontal and the vertical work receiving surfaces for spacing workpieces relative to each other during cutting.

U.S. Pat. No. 3,834,435 entitled "Dovetail Fixture" provides an apparatus for clamping and holding orthogonally disposed work pieces and for guiding a cutting tool. A slotted guide member in the form of a comb or template is held against one of the workpieces to guide a router or similar cutting tool as the bit traces the dovetail pattern. In addition novel workpiece locating members are movably attached to both the horizontal and the vertical work-receiving surfaces for spacing workpieces relative to each other during cutting.

U.S. Pat. No. 4,163,465 entitled "Apparatus For Cutting Dovetail Joints" provides a router mounted on the back of a support plate which can be raised or lowered to a precise adjusted position with respect to a base plate such that a dovetail cutting tool cuts precision dovetail joints in wooden workpieces.

U.S. Pat. No. 4,168,730 entitled "Apparatus And Method For Forming Dovetail Joints" discloses a tool set for forming dovetail joints including elongated dovetail and pin template plates and dovetail and pin bits. The dovetail plate has a plurality of laterally-extending slots opening through a long edge of plate, the slots having opposed parallel edges. The dovetail and pin bits are each provided with a bearing about their respective shanks. The elongated pin template plate has a plurality of longitudinally spaced openings each having opposed edges angled to converge toward one another at the same angle as the angle of the cutter of the dovetail bit. To form a dovetail joint using the kit, the dovetail template is disposed over the end edge of a joint member and the dovetail bit is passed through each slot with its bearing engaging the opposed edges of the slot to guide the bit whereby through dovetails are cut in the end of the joint member. The dovetailed member is then disposed over the end edge of the adjoining member and the pin locations are scribed onto its end edge. The pin template is then located over the scribed edge and the angled edges of its opening are aligned with the scribed lines. The pin template bit is inserted into the opening and the pins are cut, the bearing on the pin bit shank engaging along th edges of the openings to accurately guide the pin bit.

U.S. Pat. No. 4,405,004 entitled "Dovetail Fixture" provides an apparatus for guiding a cutting tool in cutting mortises and tenons which can be simply used in cutting mortises and tenons. The fixture includes a molded base equipped with a horizontal table or work receiving surface and a sloped apron carrying spaced apart bosses defining a vertical work receiving surface. The surfaces are adapted to support work pieces in orthogonal positions with the end of a horizontal work piece in abutting relation with the end of a vertical work piece. Also included is a first clamping means adapted to clamp the horizontal work piece against the horizontal work receiving surface and a second clamping means adapted to clamp vertical work piece against the work receiving surface in their abutting positions. A cutter guiding template is employed having at least one of its edges formed with a series of alternating guide fingers and slots. The template is adapted to overlie one of the work pieces and to be clamped thereupon in a position such that the outer edges of said set of slots and fingers is in alignment with the outer surface of the work piece.

U.S. Pat. No. 4,407,344 entitled "Dovetail Fixture" provides an apparatus for guiding a cutting tool in cutting mortises and tenons which can be simply used in cutting mortises and tenons at either of two selectable pitches. The fixture includes a base equipped with a horizontal table or work receiving surface and a vertical apron or work receiving surface. The surfaces are adapted to support work pieces in orthogonal positions with the end of a horizontal work piece in abutting relation with the end of a vertical work piece. Also included is a first clamping means adapted to clamp the horizontal work piece against the horizontal work receiving surface and a second clamping means adapted to clamp the vertical work piece against the vertical receiving surface in their abutting positions. A cutter guiding template is employed having one of its edges formed with a first series of alternating guide fingers and slots having a second, opposite edge formed with a first series of alternating guide fingers and slots and having a second, opposite edge formed with a second series of alternating guide fingers and slots. The template is adapted to overlie one of the work pieces and to be clamped thereupon in a position such that the outer edges of one selected set of slots and alignment with the outer surface of the work piece. The template is held in position by a pair of L-shaped angle support brackets pivotally mounted to the template. Each support bracket is mounted with the template by means of a single screw generally on the longitudinal center line of the template between the slotted edges so as to be pivotal therearound to selectively position the desired serries of slots and fingers in tool guiding position.

U.S. Pat. No. 4,542,776 entitled "Method and Apparatus For Manufacturing Splined Corner Joints" discloses an apparatus and method for manufacturing joints wherein two workpieces having mitered edges are joined to form a corner axis. The workpieces are clamped underneath a table having a plurality of parallel finger slots so that the corner axis is perpendicular to the lengthwise axis of the linger joints. A router is guided through the finger slots to cut aligned slots in mitered edges of the workpieces. A spline is received in the slots to lock the workpieces together.

U.S. Pat. No. 4,632,159 entitled "Clamp-On Marking Template And Saw Guide For Making Dovetail Joints" shows a saw guide and marking template for marking and cutting pin and tail face cuts required in making dovetail joints. A central template having end faces that provide angled saw guides is clamped to the edge of the board to be worked. The angled saw guides can be repositioned by either rotating them about the end of its central template or inverting the entire device.

Most of these prior art devices are complex devices with several interfitting parts. They often require that the workpiece be held by the tool which is impossible on very large pieces. They generally require trial and error fitting to make the correct joint.

SUMMARY OF THE PRESENT INVENTION

The present invention provides a very portable and easily handled apparatus for making joints in the corners of wooden boxes. The apparatus is hand held, and can be automatically indexed from one cut to the next so that it can be used on very large pieces of furniture or other large wooden box-like items without having to lift the workpiece. Rather, the apparatus itself is moved sequentially as each cut is made. An indexing plate portion of the apparatus simply registers in each successive cut automatically providing the spacing for the next cut. The apparatus includes a frame with at least one elongated post (preferably a pair of posts) mounted upon the frame and extending away from the frame. The indexing plate is mounted at an end of the post so that the post extends away from the indexing plate at generally right angles thereto. The indexing plate can be fixedly mounted relative to the posts. The frame includes a router guide block member having a longitudinal, ninety degree (90°) recess defined by two intersecting flat surfaces that meet a common line. The recess registers with the wooden box "workpiece" corner at the common line. A flat surface portion carries a transverse guide slot with a linear axis that extends transversely with respect to the posts and at generally right angles to the common line. A router can be placed upon the apparatus at the guide block so that the router blade tracks the guide slot. The posts and the indexing plate can be mounted upon any wooden box-like workpiece structure to be cut, with a holding mechanism securing the indexing plate and the frame to a box-like workpiece structure. As each cut is made the indexing plate sequentially registers with each successive cut so that the next cut can be made. Thus, a feature of the present invention is that the cuts formed in the workpiece becomes the point of orientation for the next cut, so that the apparatus can be made small, hand held, and portable.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 5 is a top view of the preferred embodiment of the apparatus of the present invention;

FIG. 6 is a prospective, fragmentary view of the preferred embodiment of the apparatus of the present invention;

FIG. 7 is another perspective view of the preferred embodiment of the apparatus of the present invention; and FIG. 8 is a fragmentary view of the preferred embodiment of the apparatus of the present invention.

DETAILED DESCRIPTION OF THE PREFERRED EMBODIMENT

Figure 1:
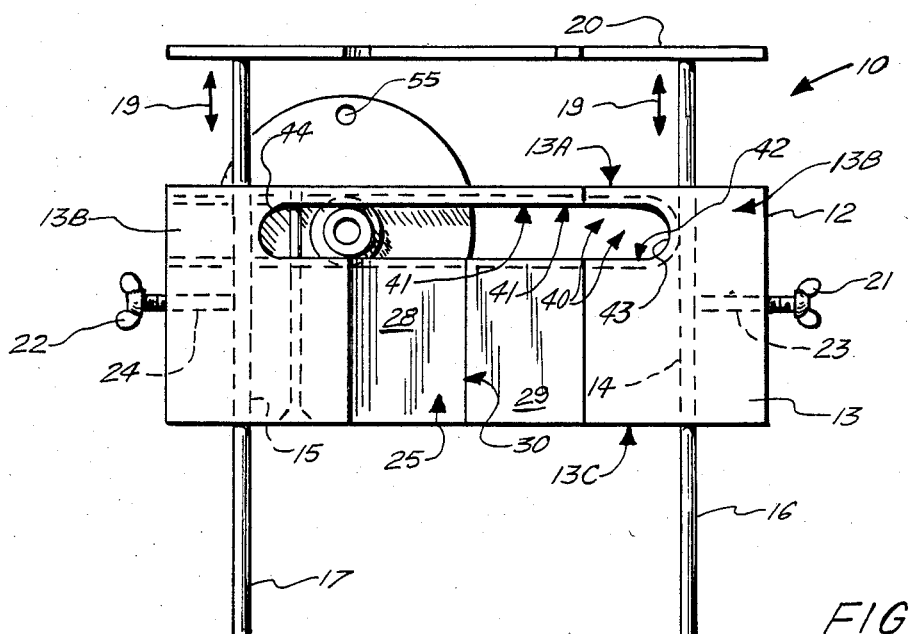
FIG. 1 is a bottom view of the preferred embodiment of the apparatus of the present invention.

FIGS. 1–4 show generally the preferred embodiment of the apparatus of the present invention designated generally by the numeral 10. In FIGS. 1–4, the apparatus 10 includes a frame 12 in the form of a guide block 13 having a pair of generally parallel elongated openings 14, 15 therethrough. Each of the openings 14, 15 is occupied during use respectively by pair of elongated extension rods 16, 17 which are of generally circular uniform cross-sectional configuration. An indexing plate 20 is mounted preferably at the end portions of the extension rods 16, 17 as shown in FIG. 1 and rigidly thereto in the preferred embodiment, so that extension of the rods 16, 17 moves the plate 20 with respect to the guide block 13.

As shown by the arrows 19 in FIG. 1, the plate 20 can move toward or away from the guide block 13 as posts 16, 17 slide with respect to block 13 in openings 14, 15. Thumb screws 21, 22 are threadably mounted within threaded openings 23, 24 which intersect the elongated openings 14, 15 so that the position of each post 16, 17 can be secured fixing the space between plate 20 and guide block 13 without the use of additional tools. It should be understood, that this arrangement provides an adjustable spacing between the plate 20 and the guide block 13 and more particularly between each cut 60–63 to be formed in a wooden box-like workpiece WP (see FIGS. 6–8).

Figure 2:
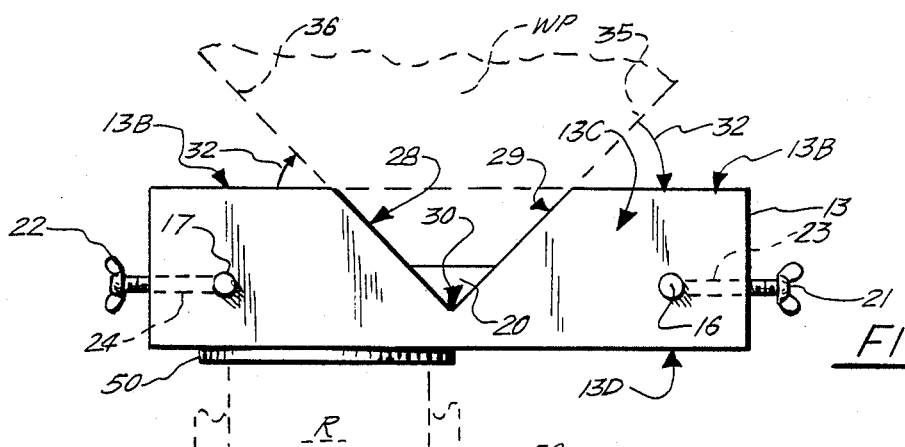
FIG. 2 is a side view of the preferred embodiment of the apparatus of the present invention.
Figure 3:
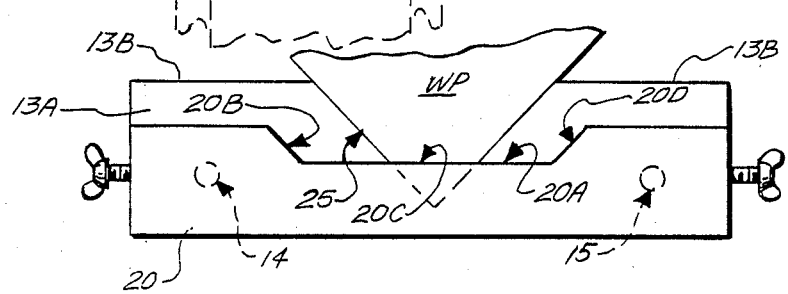
FIG. 3 is a side view of the preferred embodiment of the apparatus of the present invention.

The guide block 13 includes a plurality of generally flat transverse surfaces 13A–13D. The flat surface 13B includes two spaced apart co-planar portions as shown in FIGS. 1 and 2. A trough or V-shaped recess 25 is formed between the two flat surfaces 13B and is comprised of surfaces 28, 29 which intersect at common edge 30. The surfaces 28, 29 intersect at the edge 30 and form a ninety degree (90°) angle with respect to each other. Further, each surface 28, 29 respectively forms a forty-five degree (45°) angle 32 with the plane defined by the flat surfaces 13B. During operation, a workpiece WP typically will be a piece of furniture or the like having a corner that will occupy the recess 25 as shown in FIGS. 7–8. Thus, the workpiece WP includes a corner edge C which is an elongated line defining the intersection between two sides 35, 36 of the workpiece WP which sides 35, 36 intersect one another at an angle "B" of ninety degrees (90°).

The guide block 13 includes a transverse router slot 40 having two surfaces 41, 42 which are generally parallel to each other and which intersect at right angles the longitudinal axis of each rod 16, 17, and are also at right angles with respect to the common edge 30. Slot 40 can have rounded end portions 43, 44. Slot 40 preferably extends entirely through block 13 between the surfaces 13B and 13D. Thus, the slot 40 also extends across recess 25.

Figure 4:
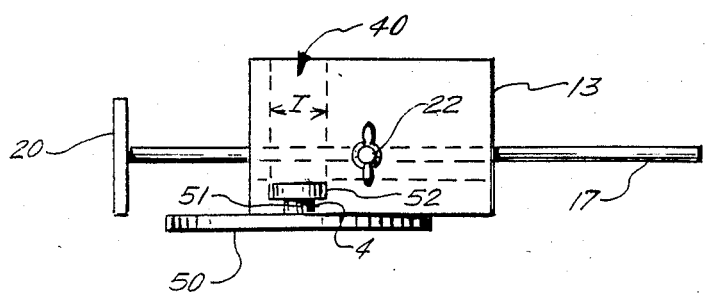
FIG. 4 is a end view of the prefered embodiment of the apparatus of the present invention.

Router mounting plate 50 can be attached to move in slot 40. Plate 50 includes a smaller diameter sleeve 51 having an enlarged diameter end portion 52. Slot 40 can have an uppermost narrowed dimensional portion 45 which is slightly larger than the diameter of sleeve 51 so that enlarged portion 52 is retained within the slot 40. Otherwise, the slot 40 would have a generally uniformed thickness T (FIG. 4). The thickness T of slot 40 would thus be slightly larger than the diameter of enlarged portion 52.

Router plate 50 can include one or more mounting holes 55 for attaching a router thereto by bolting for example. It should be understood that mounting plate 50 could be manufactured of a number of different shapes and sizes in order to accommodate different routers as constructed by different router manufacturers.

During use, the router R would be moved laterally as shown by the arrow 56 in FIG. 2. Router R carries a blade as is conventional, and the blade forms a cut such as a dovetail cut across the workpiece WP and at forty-five degrees (45°) with respect to the surfaces 35 and 36, as shown in FIG. 6.

In FIG. 6, four cuts 60–63 are shown which have been made with a cylindrical blade. However, dovetail cuts can also be formed by simply using a dovetail blade with the router R.

A feature of the present invention is that the plate 20 registers in a previous cut 60–63 to provide an index point for moving the apparatus so that the next cut 60–63 can be made with desired, pre-selected spacings between cuts but not limited to equal spaced units. Thus the present invention can be used to make bow tie joints, dovetail joints, and cuts of different size and desired spacing. Thus in FIG. 6, the plate 20 is shown in a first position P1 mounted against an end 37 of the workpiece WP. In position P2 the plate 20 has been moved to the second cut 61 while in position P3 the plate 20 occupies a fourth cut 63. During each of these movements of the plate 20, the spacing between the plate 20 and the block 13 is maintained by keeping the set screws 21, 22 tight. The plate 20 is simply placed within the cut 60 for example and registers against the side of the cut farthest from corner 37. The indexing plate 20 includes a recessed portion 20A defined by edges 20B–20D. Recessed portion 20A is a space partially occupied by the workpiece WP cutting during operations as shown in FIG. 6.

A stop screw 70 (FIG. 5) is removable and can be used to maintain the router plate 50 in position within the slot 40. However, the stop screw 70 can be removed so that plate 50 can be withdrawn and other plates accommodating different types of router can be added to the slot since the slot has an open ended portion 40A which allows removal of the plate 50 after the screw 70 has been withdrawn. Mounting screws make it easier to mount plate 50 to router (see FIG. 5A).

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for making dovetail cuts in the corner of a wooden box-like workpiece comprising:
    (a) a frame defining a router guide block portion;
    (b) at least one elongated post member supported with respect to the frame and extending away from the frame at least in part;
    (c) an indexing planar member mounted the post member so that the post extends away from the indexing member;
    (d) means for fixedly mounting the indexing member relative to the guide block portion;
    (e) the router guide block portion including a recess defined by two intersecting flat surfaces that meet at a longitudinal common line, the recess registering with the wooden box corner, a flat surface portion carrying a guide slot with a linear axis that extends transversely with respect to the post and at generally right angles to the common line;
    (f) means for securing the assembly of the frame, post member and indexing members to a wooden box-like workpiece to be cut for receiving splines.

2. The apparatus of claim 1 wherein the router guide member is a box-like member having first and second flange positions intersecting the flat surfaces at generally right angles.

3. The apparatus of claim 1 wherein there are a pair of posts, each of generally uniform cross section and the guide member has openings therethrough of corresponding side and shape to the post cross sections so that the posts slideably extend through the guide member at the openings.

4. The apparatus of claim 1 wherein the guide member has a rectangular slot that extends laterally terminating at end positions that are generally between the posts.

5. The apparatus of claim 3 wherein the indexing member is rigidly and permanently attached to ends of the respective pair posts.

* * * * *